(12) United States Patent
Hassan et al.

(10) Patent No.: US 10,334,658 B2
(45) Date of Patent: Jun. 25, 2019

(54) OBTAINING INFORMATION RELATED TO A SHARED FREQUENCY SPECTRUM ON BEHALF OF A WIRELESS NETWORK THAT LACKS INTERNET CONNECTIVITY

(71) Applicant: Microsoft Technology Licensing, LLC, Redmond, WA (US)

(72) Inventors: Amer Aref Hassan, Kirkland, WA (US); Paul William Alexander Mitchell, Seattle, WA (US); Paul William Garnett, Arlington, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/817,019

(22) Filed: Nov. 17, 2017

(65) Prior Publication Data

US 2019/0159267 A1 May 23, 2019

(51) Int. Cl.
*H04H 20/42* (2008.01)
*H04W 16/14* (2009.01)
(Continued)

(52) U.S. Cl.
CPC ............ *H04W 76/28* (2018.02); *H04H 20/42* (2013.01); *H04W 16/14* (2013.01);
(Continued)

(58) Field of Classification Search
CPC .................................................. H04W 16/14
See application file for complete search history.

(56) References Cited

U.S. PATENT DOCUMENTS 8,451,789 B2 5/2013 Junell et al.
8,483,155 B1 7/2013 Banerjea et al.
(Continued)

FOREIGN PATENT DOCUMENTS

EP 2528370 A1 11/2012
WO 2012061504 A2 5/2012

OTHER PUBLICATIONS

"Project Loon", Retrieved From <<https://web.archive.org/web/20170319051753/http:/x.company/loon/technology/>>, Mar. 19, 2017, 8 Pages.
(Continued)

*Primary Examiner* — Ross Varndell
(74) *Attorney, Agent, or Firm* — Ray Quinney & Nebeker, P.C.; Thomas M. Hardman; Nicholas Chen

(57) ABSTRACT

Disclosed herein is a system for providing information related to a shared frequency spectrum to a wireless network that lacks Internet connectivity. The system may include one or more processors and memory including instructions that are executable by the one or more processors to perform operations. The operations may include receiving registration of the wireless network when a vehicle is within a communication range of the wireless network, querying a database on behalf of the wireless network when an Internet connection is available, receiving query results including the information related to the shared frequency spectrum, and communicating the information related to the shared frequency spectrum to the wireless network when the vehicle or a proxy of the vehicle is again within the communication range of the wireless network.

20 Claims, 14 Drawing Sheets

(51) Int. Cl.
| | |
|---|---|
| *H04W 28/06* | (2009.01) |
| *H04W 28/16* | (2009.01) |
| *H04W 72/04* | (2009.01) |
| *H04W 72/08* | (2009.01) |
| *H04W 76/28* | (2018.01) |

(52) U.S. Cl.
CPC ......... *H04W 28/065* (2013.01); *H04W 28/16* (2013.01); *H04W 72/0453* (2013.01); *H04W 72/082* (2013.01)

(56) References Cited

U.S. PATENT DOCUMENTS

| | | |
|---|---|---|
| 9,065,688 B2 | 6/2015 | Jones et al. |
| 2013/0016221 A1 | 1/2013 | Charbit et al. |
| 2013/0223357 A1 | 8/2013 | Jones et al. |
| 2015/0223069 A1 | 8/2015 | Solondz |
| 2016/0209221 A1* | 7/2016 | Pfeifle ............... G01C 21/34 |
| 2016/0270090 A1* | 9/2016 | Ahmad ............... H04L 5/0066 |

OTHER PUBLICATIONS

"White Spaces Database", Retrieved From <<https://web.archive.org/web/20150929002703/http:/whitespaces.microsoftspectrum.com/>>, Sep. 29, 2015, 24 pages.

Murty, et al., "SenseLess: A Database-Driven White Spaces Network", In Proceedings of IEEE Symposium on New Frontiers in Dynamic Spectrum Access Networks, May 3, 2011, 12 pages.

"International Search Report and Written Opinion for PCT Application No. PCT/US18/059127", dated Jan. 24, 2019, 13 Pages.

\* cited by examiner

OBTAINING INFORMATION RELATED TO A SHARED FREQUENCY SPECTRUM ON BEHALF OF A WIRELESS NETWORK THAT LACKS INTERNET CONNECTIVITY

CROSS-REFERENCE TO RELATED APPLICATIONS

N/A

BACKGROUND

Demand for wireless communication is constantly increasing. The frequency spectrum, however, is a scarce resource. In many places, demand for frequency spectrum has outpaced supply, resulting in congestion and a reduction in wireless communication quality. Consequently, there is a need to utilize frequency spectrum in an innovative manner in order to ensure sustainability.

Some technologies allow spectrum to be used dynamically and shared between different uses. A Television White Space (TVWS) system, for example, allows some frequencies that have been allocated for broadcast television to be used for wireless communications. As another example, in the United States, the Federal Communications Commission (FCC) is planning to use spectrum-sharing techniques to open up the 3.5 GHz band for wireless broadband use.

In a wireless network that uses a shared frequency spectrum, there is typically some mechanism for determining what channels are available to be used. Existing mechanisms, however, assume that the wireless network is connected to the Internet. For example, in a TVWS system, an access point (or other network node) may query a TVWS database, via the Internet, to determine available channel information. The requirement to have an Internet connection may make it difficult to create wireless networks that use a shared frequency spectrum in areas (e.g., rural areas) where it may not be possible to connect to the Internet.

SUMMARY

In accordance with the present disclosure, a system for providing information related to a shared frequency spectrum to a wireless network that lacks Internet connectivity is disclosed. The system may include one or more processors and memory including instructions that are executable by the one or more processors to perform operations. The operations may include receiving registration of the wireless network when a vehicle is within a communication range of the wireless network, querying a database on behalf of the wireless network when an Internet connection is available, receiving query results including the information related to the shared frequency spectrum, and communicating the information related to the shared frequency spectrum to the wireless network when the vehicle or a proxy of the vehicle is again within the communication range of the wireless network.

The vehicle may be selected from the group consisting of a satellite, an unmanned aerial vehicle (UAV), and a land vehicle. The shared frequency spectrum may include Television White Space (TVWS) frequencies.

In some embodiments, the same vehicle may receive the registration of the wireless network, query the database on behalf of the wireless network, receive the query results, and communicate the information related to the shared frequency spectrum to the wireless network. Alternatively, multiple vehicles may be used to carry out these operations.

The information related to the shared frequency spectrum may include available channel information and a time period during which the available channel information is valid. Receiving the registration of the wireless network may include receiving an identifier and a location of the wireless network.

In embodiments where the vehicle includes a satellite, the registration of the wireless network may be received during a portion of an orbit of the satellite when the satellite is within the communication range of the wireless network. The database may be queried during another portion of the orbit of the satellite when the satellite is in wireless electronic communication with a satellite base station.

In embodiments where the vehicle includes a satellite, the information related to the shared frequency spectrum may include available channel information, and the operations may further include broadcasting the available channel information corresponding to any wireless networks that are within a footprint of the satellite.

In some embodiments, the operations additionally include communicating to the wireless network a time stamp indicating when the query results were obtained.

In some embodiments, the information related to the shared frequency spectrum may include an indication of at least one available channel. The operations may additionally include communicating to the wireless network a power level for the at least one available channel.

In some embodiments, communicating the information related to the shared frequency spectrum may include communicating changes to available channels since a prior communication.

In accordance with another aspect of the present disclosure, a system for enabling a wireless network that lacks Internet connectivity to obtain information related to a shared frequency spectrum is disclosed. The system may include one or more processors and memory including instructions that are executable by the one or more processors to perform operations. The operations may include registering the wireless network with a vehicle when the vehicle is within a communication range of the wireless network, and subsequently receiving the information related to the shared frequency spectrum when the vehicle or a proxy of the vehicle is again within the communication range of the wireless network.

The vehicle may be selected from the group consisting of a satellite, an unmanned aerial vehicle (UAV), and a land vehicle. The information related to the shared frequency spectrum may include available channel information and a time period during which the available channel information is valid.

In some embodiments, the system may be configured for implementation in an access point. The information related to the shared frequency spectrum may include available channel information. The operations may further include forcing a plurality of wireless clients that are served by the access point to communicate using at least one available channel that is specified in the available channel information.

In some embodiments, the system may be configured for implementation in a proxy node that serves a plurality of access points. The operations may further include disseminating the information related to the shared frequency spectrum to the plurality of access points.

In some embodiments, registering the wireless network with the vehicle may include transmitting an identifier and a location of the wireless network to the vehicle.

In embodiments where the vehicle includes a satellite, registering the wireless network may include receiving a beacon signal from the satellite, negotiating a communication channel with the satellite, and transmitting an identifier and a location of the wireless network to the satellite via the communication channel.

In embodiments where the vehicle includes a satellite, the operations may further include listening for communication from the satellite only during time periods when the satellite is scheduled to be within the communication range of the wireless network.

In some embodiments, the operations may additionally include receiving a time stamp indicating when the information related to the shared frequency spectrum was obtained.

In accordance with another aspect of the present disclosure, a method for providing information related to a shared frequency spectrum to a wireless network that lacks Internet connectivity is disclosed. The method may include receiving registration of the wireless network when a vehicle is within a communication range of the wireless network, querying a database on behalf of the wireless network when an Internet connection is available, receiving query results including the information related to the shared frequency spectrum, and communicating the information related to the shared frequency spectrum to the wireless network when the vehicle or a proxy of the vehicle is again within the communication range of the wireless network.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Additional features and advantages of implementations of the disclosure will be set forth in the description that follows, and in part will be apparent from the description, or may be learned by the practice of the teachings herein. The features and advantages of such implementations may be realized and obtained by means of the instruments and combinations particularly pointed out in the appended claims. These and other features will become more fully apparent from the following description and appended claims, or may be learned by the practice of such implementations as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, similar reference numbers have been used for similar features in the various embodiments. Unless indicated otherwise, these similar features may have the same or similar attributes and serve the same or similar functions. Understanding that the drawings depict some examples of embodiments, the embodiments will be described and explained with additional specificity and detail through the use of the accompanying drawings in which.

DETAILED DESCRIPTION

Figure 1:
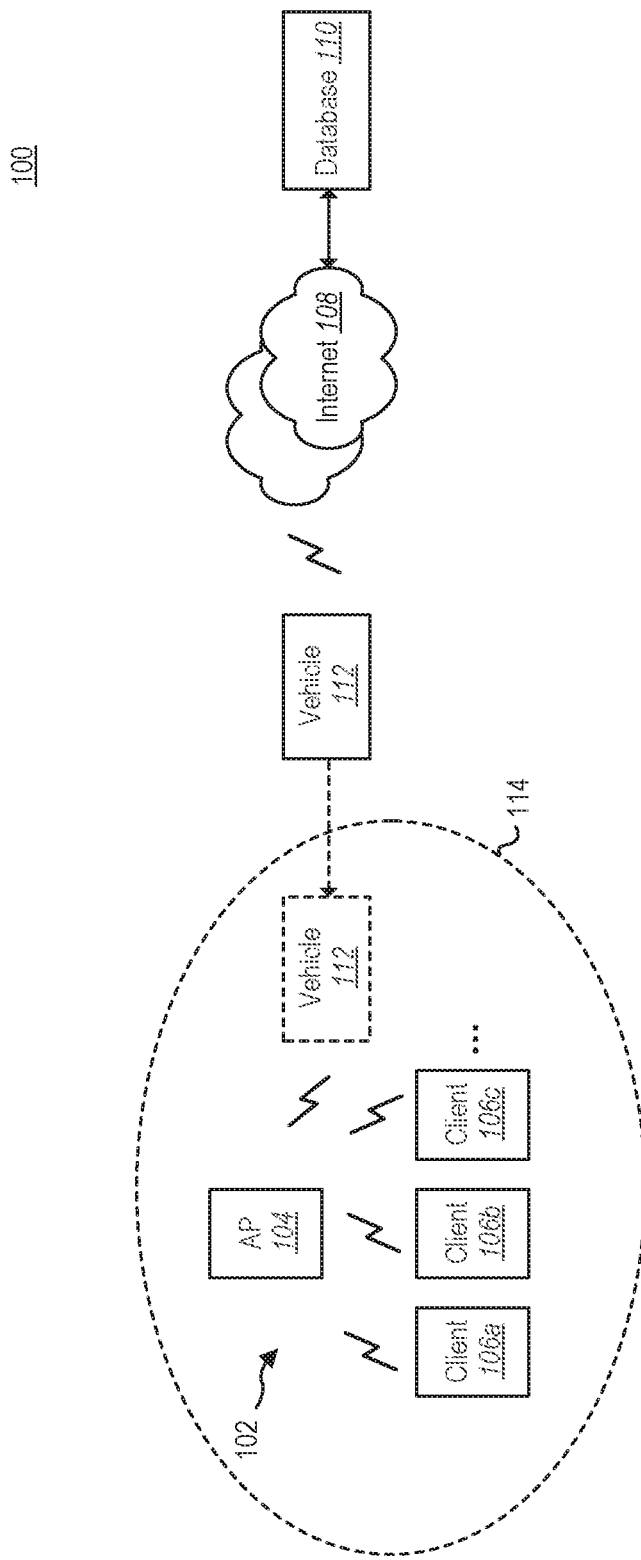
FIG. 1 illustrates a system in which aspects of the present disclosure may be utilized.

FIG. 1 illustrates a system 100 in which aspects of the present disclosure may be utilized. The system 100 includes a wireless network 102, which may be a wireless local area network (WLAN) that includes at least one access point 104 and multiple wireless clients 106*a-c*. There are many different types of wireless clients 106*a-c* that may be included in a wireless network 102 in accordance with the present disclosure. For example, in some embodiments, the wireless clients 106*a-c* may include Internet of Things (IoT) devices that allow objects to be sensed or controlled remotely. The wireless clients 106*a-c* may also include communication and/or computing devices such as smartphones, laptop computers, or desktop computers that are equipped with a wireless network interface.

The frequencies that are used for communications between the access point 104 and the wireless clients 106*a-c* may be part of a shared frequency spectrum. For example, in some embodiments, communications between the access point 104 and the wireless clients 106*a-c* may use TVWS frequencies. As indicated above, TVWS frequencies are frequencies that have been allocated for broadcast television but that are at least sometimes unused and therefore available for wireless communications.

Many wireless networks 102 in use today operate in accordance with one or more of the Institute of Electrical and Electronics Engineers (IEEE) 802.11 standards, which are sometimes referred to as Wi-Fi®. Wi-Fi® technology most commonly uses the 2.4 GHz and 5.8 GHz radio bands. The IEEE 802.11af standard, however, provides for wireless communications in the very high frequency (VHF) and ultra high frequency (UHF) bands between 54 and 790 MHz. There are several advantages to configuring a wireless network 102 to use TVWS frequencies for wireless communications instead of the more commonly used higher frequencies. For example, for the same amount of power, a TVWS signal can cover a far wider area than a higher-frequency signal can. This means that fewer antennas and fewer access points 104 are required for wireless communications, which may reduce the cost associated with constructing a wireless network 102.

As noted above, in a wireless network 102 that uses a shared frequency spectrum (such as TVWS frequencies), there is typically some mechanism for determining what channels are available to be used. Existing mechanisms, however, assume that the wireless network 102 is connected to the Internet 108. In known TVWS systems, for example, an access point 104 (or other network node) periodically queries a database 110, via the Internet 108, to determine available channel information. The database 110 keeps track of which channels are available for TVWS transmissions in particular locations. The database 110 may be maintained by a government regulator or by a private entity who implements a system access model that is approved by the government regulator.

Under some circumstances, however, a wireless network 102 that uses a shared frequency spectrum may lack a reliable, consistent connection to the Internet 108. In some cases, a wireless network 102 that uses a shared frequency spectrum may be located in a rural area where it is not possible to connect to the Internet 108 at all. For example, wireless networks 102 that use TVWS frequencies are being constructed in many developing countries that lack needed infrastructure for providing connectivity to the Internet 108.

The present disclosure is generally related to enabling wireless networks 102 that use a shared frequency spectrum but lack a connection to the Internet 108 to obtain information related to the shared frequency spectrum. A system 100 in accordance with the present disclosure includes a vehicle 112 that is capable of moving into and out of the communication range 114 of the wireless network 102. In some embodiments, the vehicle 112 may be an aerial vehicle (e.g., a satellite, a UAV). In other embodiments, the vehicle 112 may be a land vehicle (e.g., cars, trucks, vans, sport utility vehicles). The vehicle 112 may be manned or unmanned.

As shown in FIG. 1, the vehicle 112 may move from a location outside of the communication range 114 of the wireless network 102 (where the vehicle 112 is connected to the Internet 108) to a location within the communication range 114 of the wireless network 102 (where the vehicle 112 is in wireless electronic communication with the access point 104). The vehicle 112 may also move in the opposite direction.

When the vehicle 112 is within the communication range 114 of a wireless network 102, the wireless network 102 may communicate information about itself, such as its location, to the vehicle 112. The vehicle 112 is also capable of establishing a connection to the Internet 108, typically when the vehicle 112 has moved outside of the communication range 114 of the wireless network 102. When the vehicle 112 is connected to the Internet 108, the vehicle 112 may access the Internet 108 in order to determine information related to the shared frequency spectrum (e.g., available channel information) on behalf of the wireless network 102. For example, the vehicle 112 may query a database 110 on behalf of the wireless network 102. Then, when the vehicle 112 returns to a location within the communication range 114 of the wireless network 102, the vehicle 112 may communicate the requested information to the wireless network 102.

For the sake of simplicity, the vehicle 112 is shown as interacting with just one wireless network 102, and the wireless network 102 is shown with just one access point 104. This is done for the sake of simplicity only, and should not be interpreted as limiting the scope of the present disclosure. Those skilled in the art will recognize that the techniques disclosed herein may be utilized in connection with many wireless networks 102 in many different locations, and that a wireless network 102 may include multiple access points 104.

Figure 2A:
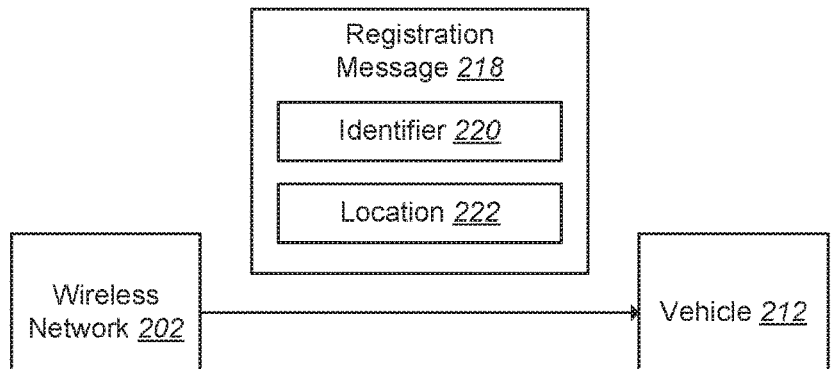
FIGS. 2A-C illustrate an example showing how a vehicle may obtain information related to a shared frequency spectrum on behalf of a wireless network that lacks Internet connectivity.
Figure 2B:
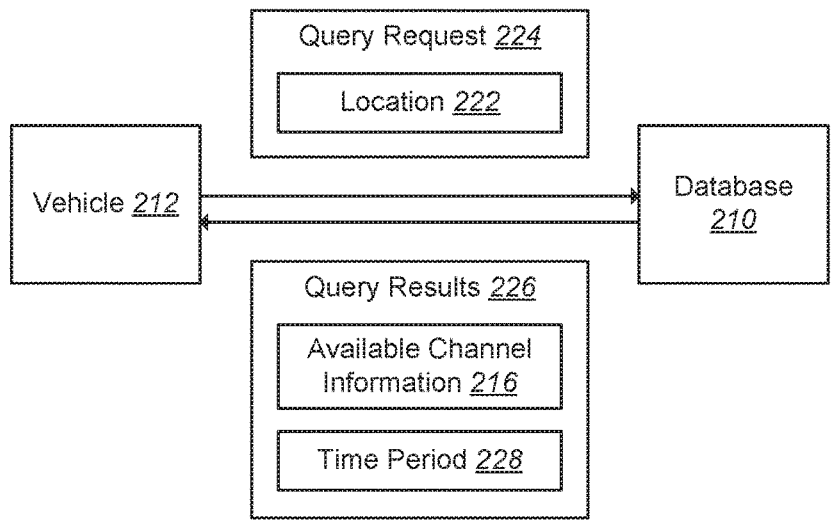
Figure 2C:
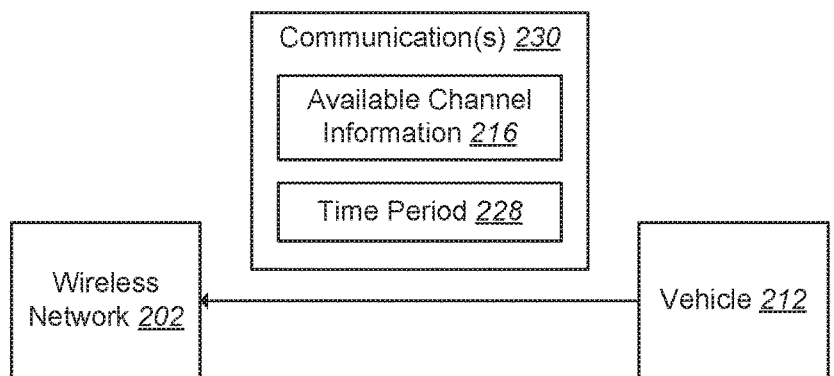

FIGS. 2A-C illustrate an example showing how a vehicle 212 may obtain information related to a shared frequency spectrum (e.g., available channel information 216) on behalf of a wireless network 202 that lacks Internet 108 connectivity. Reference is initially made to FIG. 2A. At some point, the vehicle 212 may move within the communication range 114 of the wireless network 202. When this happens, the wireless network 202 may register with the vehicle 212. For example, a node within the wireless network 202 (e.g., an access point 104) may transmit a registration message 218 to the vehicle 212. The registration message 218 may include an identifier 220 for the wireless network 202. The identifier 220 may be, for example, a service set identifier (SSID). The wireless network 202 may also be aware of its location 222, and the registration message 218 may include the location 222 of the wireless network 202 as well. The location 222 may be expressed in terms of geographic coordinates (e.g., longitude and latitude).

Referring now to FIG. 2B, at a subsequent point in time, the vehicle 212 may establish a connection to the Internet 108. This may occur after the vehicle 212 has moved outside of the communication range 114 of the wireless network 202. While connected to the Internet 108, the vehicle 212 may query a database 210 on behalf of the wireless network 202. FIG. 2B shows the vehicle 212 sending a query request 224 to the database 210. The query request 224 may ask for information related to the shared frequency spectrum that will be used by the wireless network 202, such as what channels are available to be used. Because the available channels may depend on location 222, the location 222 of the wireless network 202 may be included as part of the query request 224.

In response to the query request 224, the vehicle 212 may receive query results 226 that include the requested information related to the shared frequency spectrum. For example, if the query request 224 asks for all of the available channels in the location 222 of the wireless network 202, the query results 226 may include available channel information 216 for that location 222. Channels may be available for a limited period of time, and different channels may be available at different times. Thus, the query results 226 may also include an indication of a time period 228 during which the available channel information 216 is valid.

Referring now to FIG. 2C, at some point after receiving the query results 226, the vehicle 212 may move back into the communication range 114 of the wireless network 202. At this point, the vehicle 212 may communicate the information related to the shared frequency spectrum to the wireless network 202. For example, if the query results 226 include available channel information 216, the vehicle 212 may send one or more communications 230 to the wireless network 202 that indicate the available channel information 216. The communications 230 may also indicate the time period 228 during which the available channel information 216 is valid.

The wireless network 202 may use the available channel information 216 to identify one or more channels that it can use for wireless communications. The available channel information 216 may indicate channels that the wireless network 202 is allowed to use by law. This may be the case, for example, if the wireless network 202 is configured to use TVWS frequencies for wireless communications. In some embodiments, the available channel information 216 may enable the wireless network 202 to find one or more channels that are better than the channel(s) the wireless network 202 is already using.

Figure 2D:
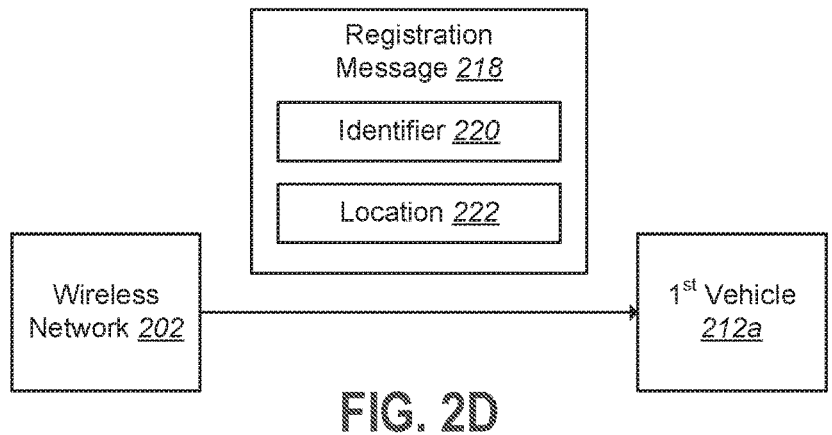
FIGS. 2D-F illustrate an example in which multiple vehicles are used to obtain information related to a shared frequency spectrum on behalf of a wireless network that lacks Internet connectivity.
Figure 2E:
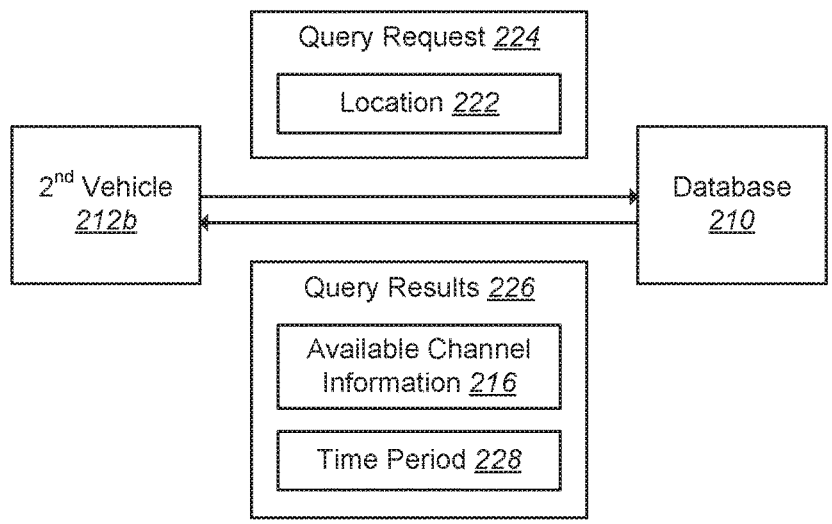
Figure 2F:
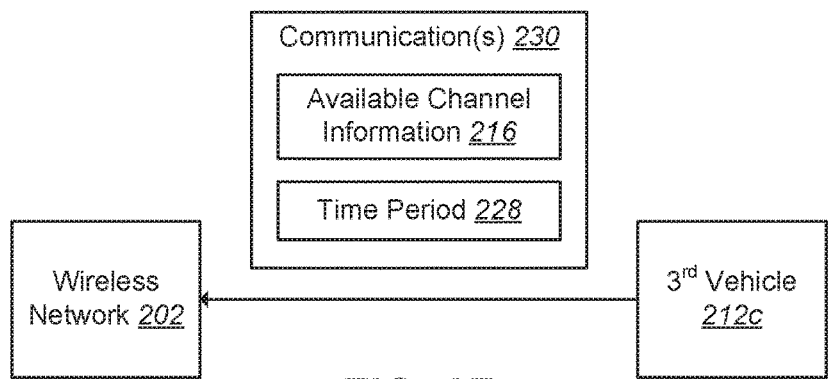

In the example shown in FIGS. 2A-C, the same vehicle 212 receives registration of the wireless network 202, queries the database 210, receives the query results 226, and communicates the information related to the shared frequency spectrum to the wireless network 202. In alternative embodiments, multiple vehicles 212 may be used to carry out these operations. For example, referring to FIGS. 2D-F, a first vehicle 212a may receive registration of the wireless network 202. A second vehicle 212b (which may be considered to be a proxy of the first vehicle 212a) may query the database 210 and receive the query results 226. A third vehicle 212c (which may also be considered to be a proxy of the first vehicle 212a) may communicate the information related to the shared frequency spectrum to the wireless network 202. Alternatively, the first vehicle 212a may receive registration of the wireless network 202, query the database 210, and receive the query results 226, and then a different vehicle 212c may communicate the information to the wireless network 202.

Figure 3A:
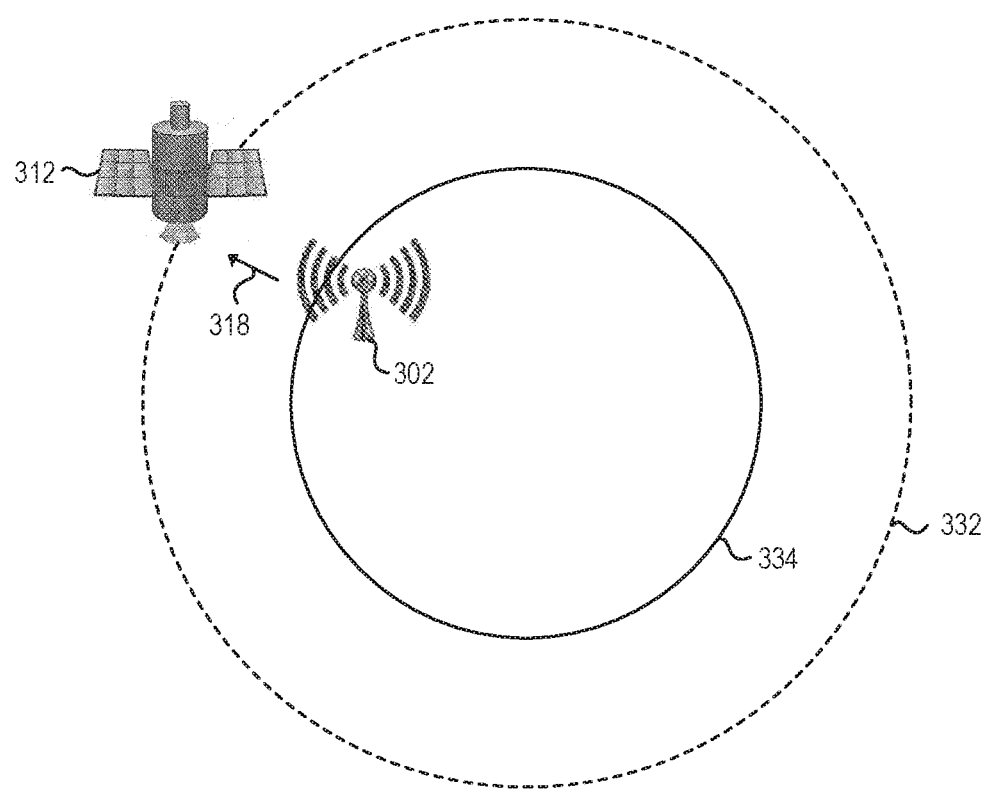
FIGS. 3A-B illustrate an example showing how a satellite may obtain information related to a shared frequency spectrum on behalf of a wireless network that lacks Internet connectivity.
Figure 3B:
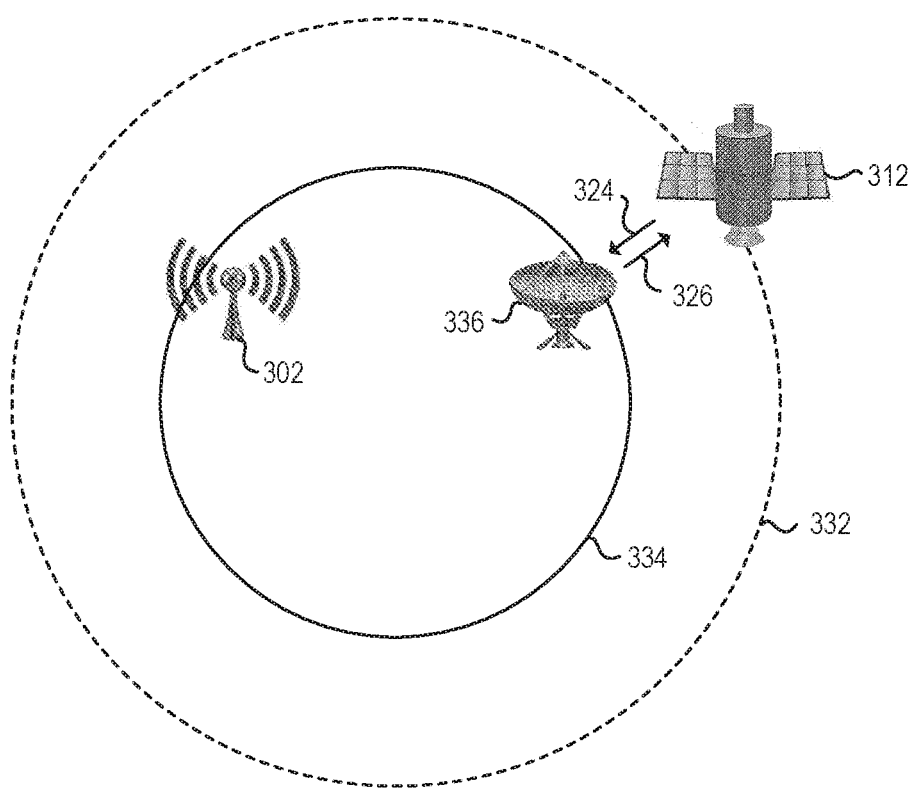

As indicated above, there are many different types of vehicles 112 that may be used in accordance with the present disclosure. FIGS. 3A-B illustrate an example in which the vehicle 112 is a satellite 312. In some embodiments, the satellite 312 may be a low Earth orbit (LEO) satellite 312.

Referring initially to FIG. 3A, at some point during the orbit 332 of the satellite 312 around the Earth 334, the satellite 312 may move into the communication range 114 of a wireless network 302. While the satellite 312 is within the communication range 114 of the wireless network 302, the wireless network 302 may register with the satellite 312 (if it has not already done so). For example, as discussed above, a node within the wireless network 302 (e.g., an access point 104) may transmit a registration message 318 to the satellite 312. The registration message 318 may include an identifier 220 of the wireless network 302 and the location 222 of the wireless network 302.

Reference is now made to FIG. 3B. Subsequently, as the satellite 312 continues in its orbit 332 around the Earth 334, the satellite 312 may establish a connection to the Internet 108. More specifically, the satellite 312 may move into the communication range of a satellite base station 336 that is connected to the Internet 108. When the satellite 312 is connected to the Internet 108, the satellite 312 may send a query request 324 to a database 110 on behalf of the wireless network 302. The satellite 312 may receive query results 326 including information (e.g., available channel information 216) related to a shared frequency spectrum that may be used by the wireless network 302. The satellite 312 may communicate the query results 326 to the wireless network 302 when the satellite 312 moves back into the communication range 114 of the wireless network 302.

Figure 4:
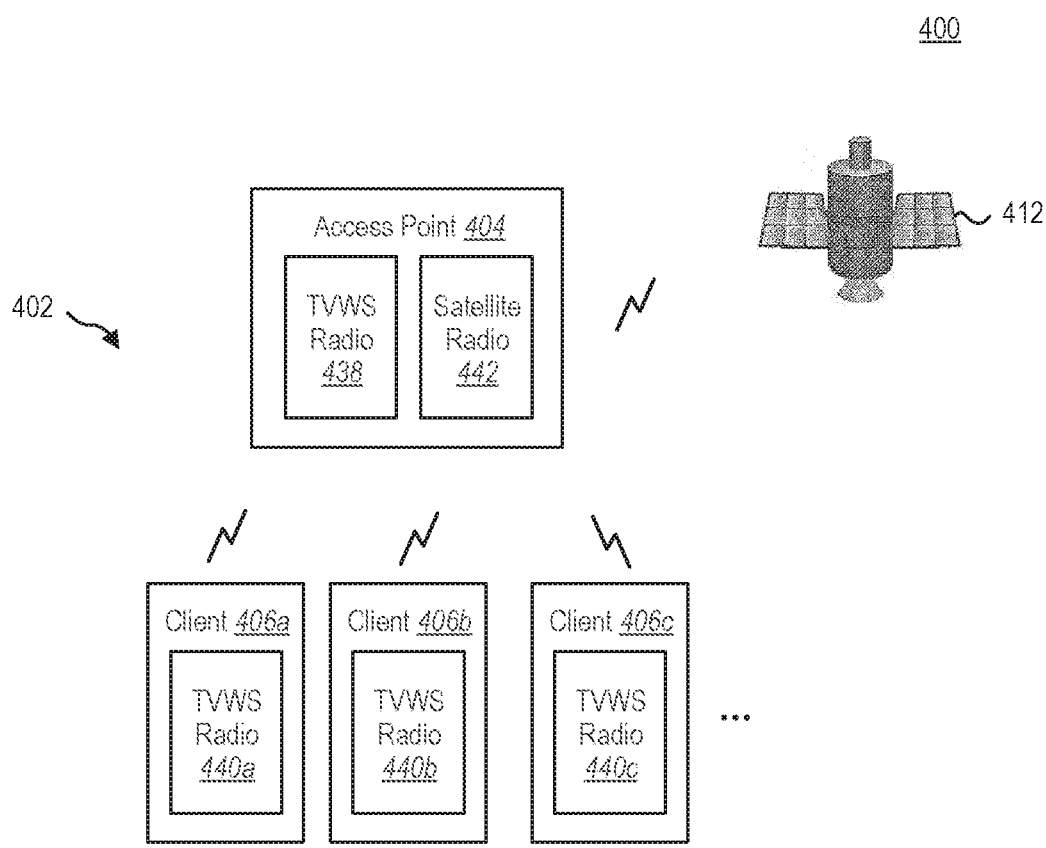
FIG. 4 illustrates aspects of a system in which a satellite obtains information on behalf of a wireless network that uses TVWS frequencies.

FIG. 4 illustrates aspects of a system 400 in which a satellite 412 obtains information on behalf of a wireless network 402 that uses TVWS frequencies. The wireless network 402 includes an access point 404 and multiple wireless clients 406a-c. TVWS frequencies may be used for wireless communications between the access point 404 and the wireless clients 406a-c. To facilitate these wireless communications, the access point 404 includes a TVWS radio 438, and the wireless clients 406a-c each include a TVWS radio 440a-c. In some embodiments, the TVWS radios 438, 440a-c may be configured to operate in accordance with the IEEE 802.11af standard. The access point 404 also includes a satellite radio 442 for wireless communications with the satellite 412.

Figure 5:
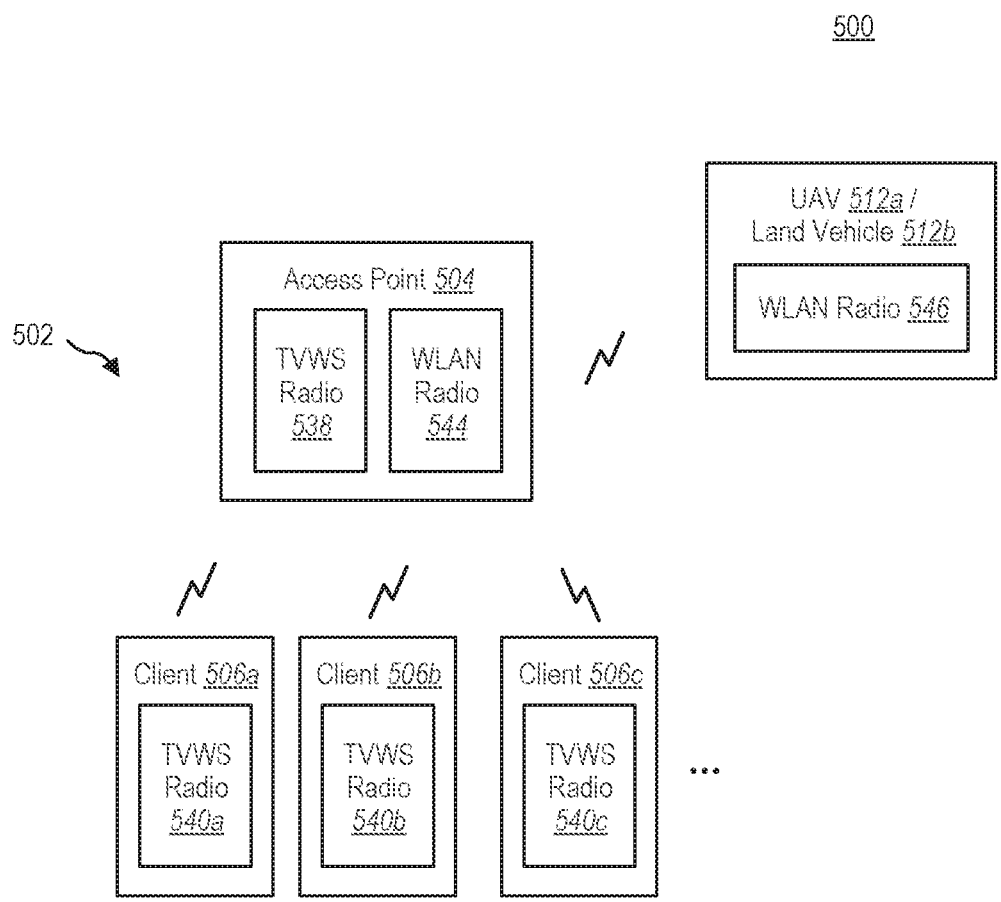
FIG. 5 illustrates aspects of a system in which an unmanned aerial vehicle (UAV) or a land vehicle obtains information on behalf of a wireless network that uses TVWS frequencies.

FIG. 5 illustrates aspects of a system 500 in which a UAV 512a or a land vehicle 512b obtains information on behalf of a wireless network 502 that uses TVWS frequencies. As in the system 400 shown in FIG. 4, the access point 504 includes a TVWS radio 538, and the wireless clients 506a-c each include a TVWS radio 540a-c. The access point 504 also includes a WLAN radio 544, and the UAV 512a or land vehicle 512b includes a WLAN radio 546 as well. The WLAN radios 544, 546 may each be configured to operate in accordance with an IEEE 802.11 standard that uses frequencies other than TVWS frequencies. For example, the WLAN radios 544, 546 may use the 2.4 GHz and 5.8 GHz radio bands. Thus, TVWS frequencies may be used for wireless communications between the access point 504 and the wireless clients 506a-c, and wireless communications between the access point 504 and the UAV 512a or land vehicle 512b may utilize conventional Wi-Fi® frequencies.

Figure 6:
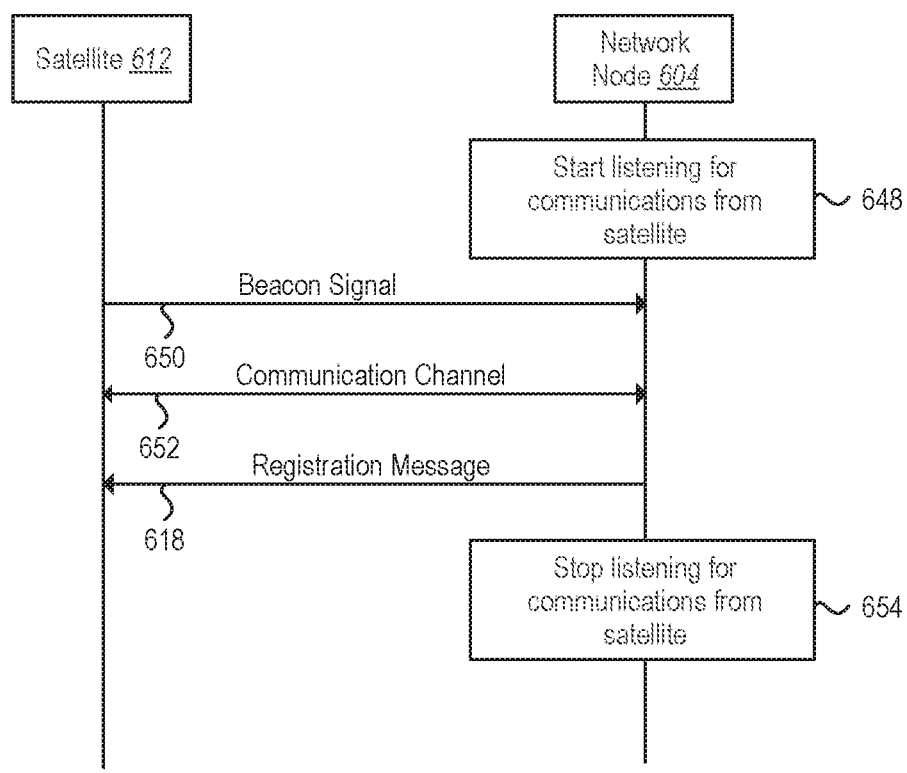
FIG. 6 illustrates an example showing how a wireless network may register with a satellite.

FIG. 6 illustrates an example showing how a wireless network 102 may register with a satellite 612. The wireless network 102 may be configured so that at least one node 604 within the wireless network 102 communicates with the satellite 612. This network node 604 may be, for example, an access point 104. Alternatively, the network node 604 that communicates with the satellite 612 may be another device or system that is in electronic communication with one or more access points 104 of the wireless network 102.

The network node 604 may be configured to listen for communications from the satellite 612. In some embodiments, the network node 604 may be configured so that it always listens for communications from the satellite 612. Alternatively, the orbit 332 of the satellite 612 may be known to the network node 604, such that the network node 604 may know when (or at least approximately when) the satellite 612 is going to be within the communication range 114 of the wireless network 102. In such embodiments, the network node 604 may be configured so that it listens for communications from the satellite 612 only during time periods when the satellite 612 is scheduled to be within the communication range 114 of the wireless network 102. Thus, at the beginning of a time period when the satellite 612 is scheduled to be within the communication range 114 of the wireless network 102, the network node 604 may start listening 648 for communications from the satellite 612.

The satellite 612 may be configured so that it continuously transmits a beacon signal 650. When the satellite 612 moves within the communication range 114 of the wireless network 102, the network node 604 may receive the beacon signal 650. In response, the network node 604 may negotiate a communication channel 652 with the satellite 612. The network node 604 may then register the wireless network 102 with the satellite 612 by transmitting a registration message 618 via the communication channel 652. The registration message 618 may include an identifier 220 for the wireless network 102 and a location 222 of the wireless network 102. At the end of the time period when the satellite 612 is scheduled to be within the communication range 114 of the wireless network 102, the network node 604 may stop listening 654 for communications from the satellite 612.

Figure 7A:
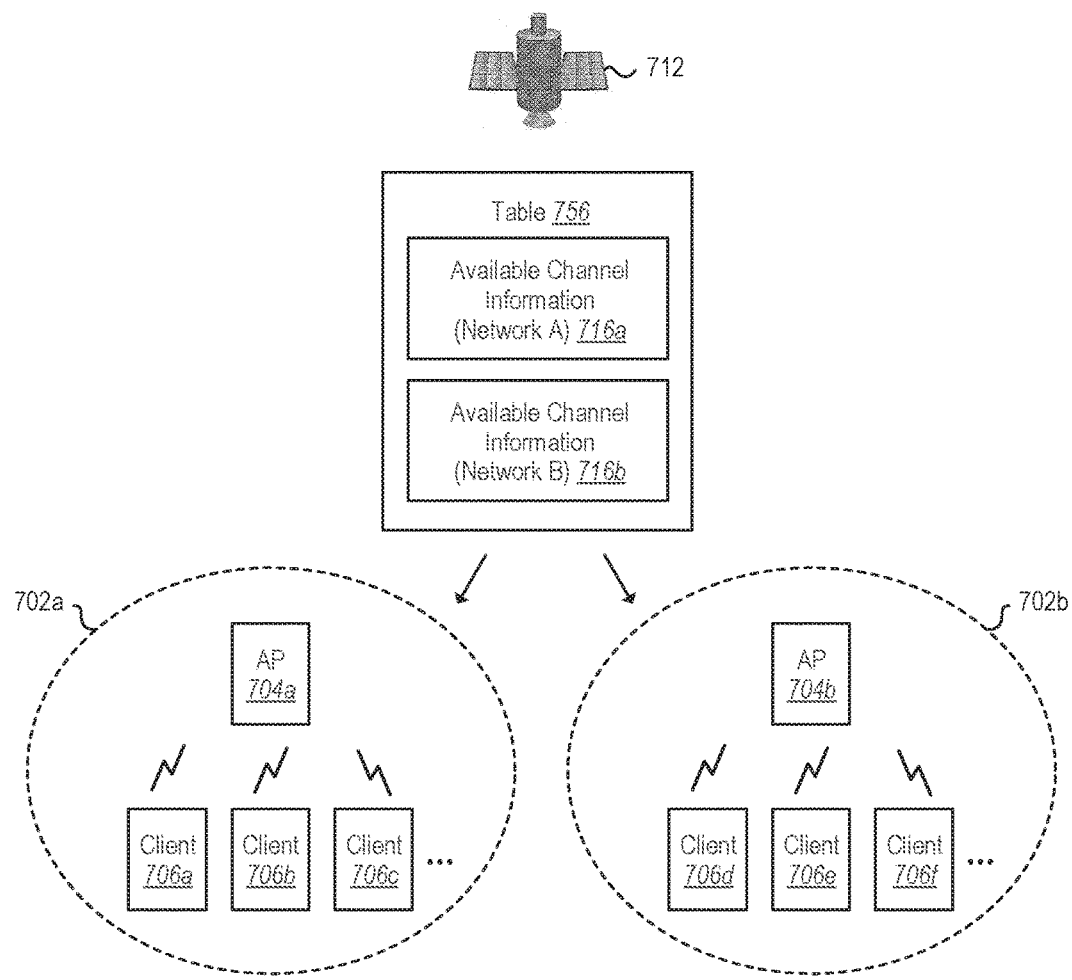
FIGS. 7A-B illustrate examples showing how a satellite may communicate information related to a shared frequency spectrum to wireless networks.

FIG. 7A illustrates an example showing how a satellite 712 may communicate information related to a shared frequency spectrum to wireless networks 702*a-b*. In this example, it will be assumed that multiple wireless networks 702*a-b* have registered with the satellite 712, and that the satellite 712 has obtained available channel information 716*a-b* on behalf of these wireless networks 702*a-b*.

As the satellite 712 moves in its orbit 332 around the Earth 334, the satellite 712 may communicate the available channel information 716*a-b* to the wireless networks 702*a-b*. In some embodiments, the satellite 712 may broadcast the available channel information 716*a-b* corresponding to any wireless networks 702*a-b* that are within the footprint of the satellite 712. In this context, the term "broadcast" may refer to a transmission over a common channel (e.g., a broadcast channel, a paging channel). The "footprint" of a satellite 712 at a particular point in time includes those wireless networks 702*a-b* that are within the communication range of the satellite 712 (i.e., the wireless networks 702*a-b* with which the satellite 712 is able to communicate at that time).

In some embodiments, the satellite 712 may be configured so that it periodically determines which wireless networks 702*a-b* are within the footprint of the satellite 712, and broadcasts a table 756 that includes available channel information 716*a-b* corresponding to those wireless networks 702*a-b*. Because the number and identity of the wireless networks 702*a-b* that are within the footprint of the satellite 712 change as the satellite 712 moves in its orbit 332 around the Earth 334, the contents of the table 756 that the satellite 712 broadcasts may also change.

In the example shown in FIG. 7A, there are two wireless networks: a first wireless network 702*a* including an access point 704*a* and wireless clients 706*a-c*, and a second wireless network 702*b* including an access point 704*b* and wireless clients 706*d-f*. Assuming that both wireless networks 702*a-b* are within the footprint of the satellite 712 at a particular point in time, the table 756 that is broadcast by the satellite 712 may include available channel information 716*a-b* for both wireless networks 702*a-b*. Both access points 704*a-b* may receive the table 756 and identify the relevant available channel information 716*a-b* in the table 756.

When a particular access point 704*a-b* receives available channel information 716*a-b* from the satellite 712 (or another type of vehicle 112), the access point 704*a-b* may then force the wireless clients 706*a-f* that are served by the access point 704*a-b* to communicate using the available channels that are specified in the available channel information 716*a-b*. In other words, the access point 704*a-b* within a particular wireless network 702*a-b* may restrict wireless communications within that wireless network 702*a-b* to those channels that are specified in the available channel information 716*a-b*.

If the configuration of the wireless networks 702*a-b* has not changed significantly since they registered with the satellite 712, then the wireless networks 702*a-b* may simply receive the available channel information 716*a-b* from the satellite 712 without transmitting any information to the satellite 712. If, however, any significant aspect of the configuration of the wireless networks 702*a-b* has changed (e.g., a change in location 222), then one or more of the wireless networks 702*a-b* may request a communication channel 652 from the satellite 712 and transmit the relevant information (e.g., a new location 222) to the satellite 712 via the communication channel 652.

Figure 7B:
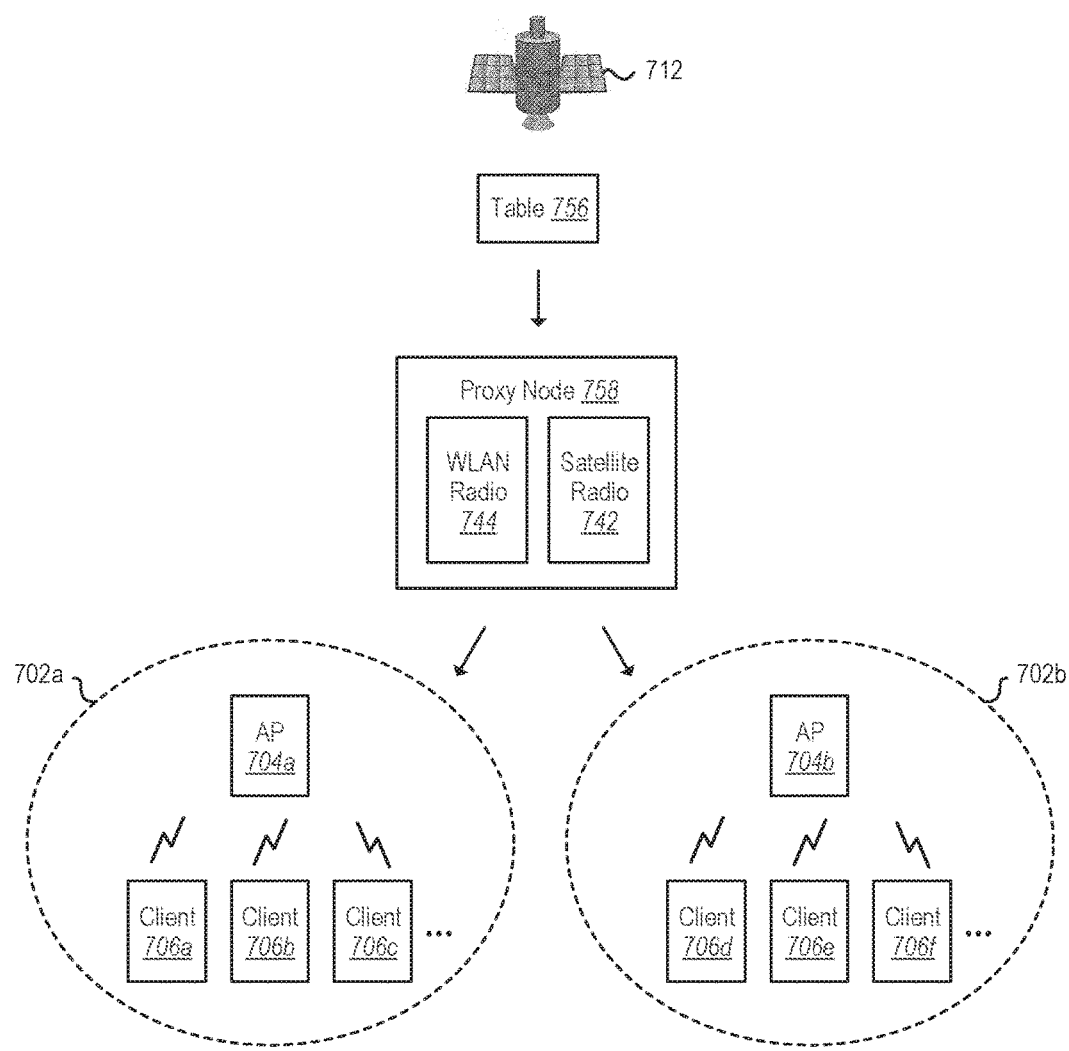

FIG. 7B illustrates another example showing how a satellite 712 may communicate information related to a shared frequency spectrum (e.g., available channel information 716*a-b*) to wireless networks 702*a-b*. As in the previous example, two wireless networks 702*a-b* are shown in FIG. 7B. In addition, the example shown in FIG. 7B includes an additional network node that serves the access points 704*a-b* in the wireless networks 702*a-b*. This additional network node may be referred to as a proxy node 758. The proxy node 758 may be a relatively large structure (e.g., a large tower), and the wireless networks 702*a-b* may be located within the communication range of the proxy node 758.

In the example shown in FIG. 7A, the access points 704*a-b* listen for communications from the satellite 712. In contrast, in the example shown in FIG. 7B, the proxy node 758 listens for communications from the satellite 712, and disseminates the information received from the satellite 712 (e.g., available channel information 716*a-b*) to the access points 704*a-b*.

Communication between the proxy node 758 and the access points 704*a-b* may occur via conventional Wi-Fi® technologies (in other words, based on an IEEE 802.11 standard that may use, for example, the 2.4 GHz and/or 5.8 GHz radio bands). Thus, the proxy node 758 may include a satellite radio 742 for wireless communications with the satellite 712, and a WLAN radio 744 for wireless communications with the access points 704*a-b*. The access points 704*a-b* may be configured similarly to the access point 504 shown in FIG. 5, and may include a WLAN radio 544 for communicating with the proxy node 758 and a TVWS radio 538 for communicating with the wireless clients 706*a-f*.

As an alternative to broadcasting available channel information 716*a-b* to wireless networks 702*a-b*, a satellite 712 (or other vehicle 112) may transmit such information to wireless networks 702*a-b* via some other mechanism. For example, in some embodiments, a satellite 712 (or other vehicle 112) may transmit available channel information 716*a-b* to wireless networks 702*a-b* via a multicast signal.

Figure 8:
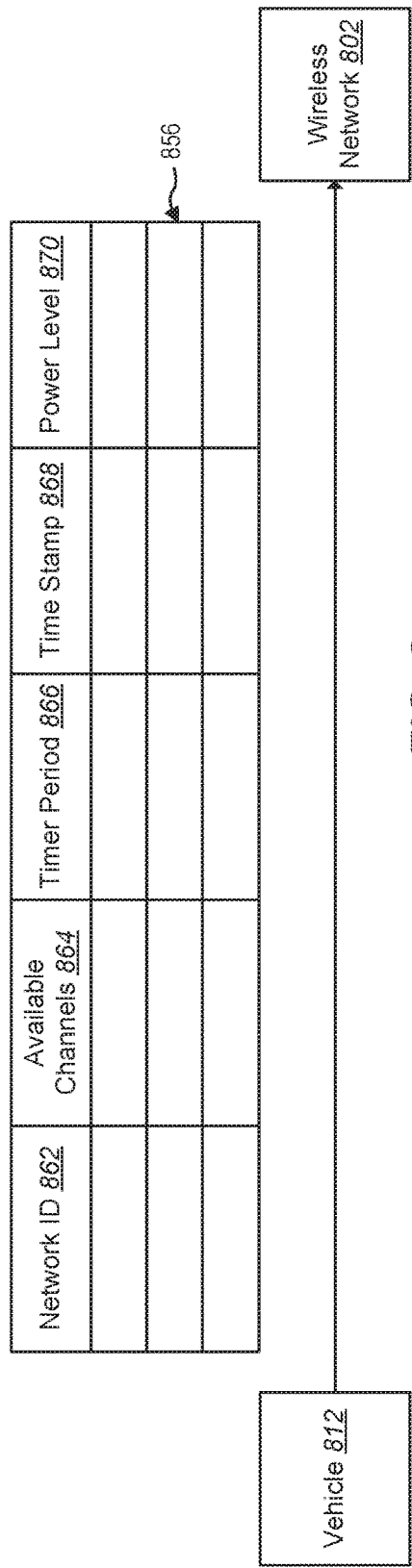
FIG. 8 illustrates an example of a table that a vehicle may broadcast or otherwise transmit to wireless networks.

FIG. 8 illustrates an example of a table 856 that a vehicle 812 may broadcast or otherwise transmit to wireless networks 802. The table 856 includes a network identifier field 862 and an available channels field 864. As discussed above, a vehicle 812 may connect to the Internet 108 and obtain available channel information 216 on behalf of a wireless network 802. The available channel information 216 may include an indication of at least one available channel within a shared frequency spectrum that may be used by the wireless network 802 for wireless communications. For example, if the wireless network 802 uses TVWS frequencies for wireless communications, then the available channel information 216 may include an indication of at least one channel within the TVWS frequencies that is available in the location 222 of the wireless network 802.

In order to communicate the available channel information 216 to a particular wireless network 802 that is within the communication range of the vehicle 812, the vehicle 812 may add a record to the table 856 that includes the available channel information 216 in the available channels field 864. The record may also include the network identifier 220 for that wireless network 802 in the network identifier field 862. As discussed above, the vehicle 812 may receive the network identifier 220 when the wireless network 802 registers with the vehicle 812.

The depicted table 856 also includes a time period field 866. As indicated above, in addition to available channel information 216, the query results 226 obtained by the vehicle 812 may also include a time period 228 during which the available channel information 216 is valid. An indication of this time period 228 may be included in the time period field 866 of the table 856.

The depicted table 856 also includes a time stamp field 868. A time stamp indicating when the query results 226 were obtained may be included in the time stamp field 868. Having the time stamp may be useful because there may be a delay between the time at which the vehicle 812 queries the database 110 and the time at which the query results 226 are communicated to the wireless network 802.

Suppose, for example, that it takes 30 minutes for the vehicle 812 to travel from (i) a location where the vehicle 812 is connected to the Internet 108 and queries the database 110 on behalf of the wireless network 802, to (ii) another location where the vehicle 812 is within the communication range 114 of the wireless network 802. Further suppose that the query results 226 obtained by the vehicle 812 include available channel information 216 that is valid for the next 8 hours. By the time the vehicle 812 is able to communicate the available channel information 216 to the wireless network 802, however, the available channel information 216 will only be valid for the next 7.5 hours. Having the time stamp indicating when the query results 226 were obtained enables the wireless network 802 to be able to adjust the value in the time period field 866 to compensate for the time it takes the vehicle 812 to travel from (i) to (ii).

In some embodiments, the vehicle 812 may add the time stamp to the table 856 when the vehicle 812 receives the query results 226. Alternatively, the database 110 may add the time stamp to the query results 226. In some embodiments, instead of providing a separate time stamp field 868, the vehicle 812 may simply adjust the time period field 866 based on the time it takes the vehicle 812 to travel from (i) to (ii).

The depicted table 856 also includes a power level field 870. The power level field 870 may be used to specify a power level for the channel(s) that are identified in the available channels field 864. The power level may be, for example, the maximum power level at which signals may be transmitted on the available channel(s).

Figure 9A:
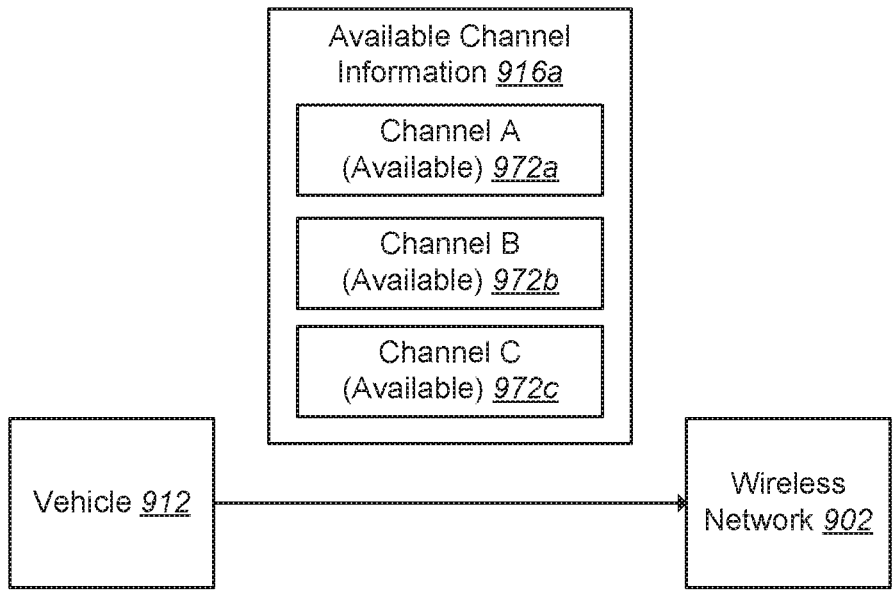
FIGS. 9A-B illustrate an example showing how a vehicle may only communicate the changes to available channels since a prior communication.
Figure 9B:
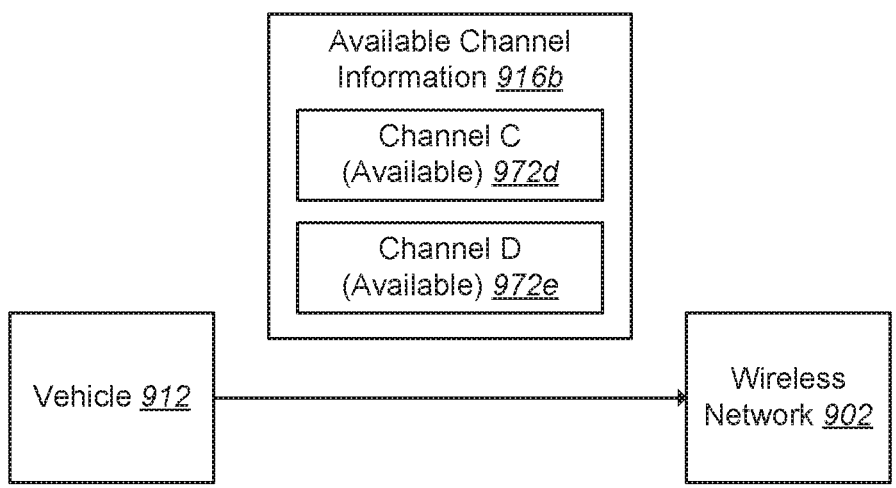

Reference is now made to FIGS. 9A-B. It may not be necessary to transmit all of the available channel information 916a-b for a particular wireless network 902 each time that a vehicle 912 moves within the communication range 114 of that wireless network 902. In some areas (e.g., rural areas), the available channel information 916a-b may not change very frequently. Thus, in some embodiments, a vehicle 912 may be configured so that it only communicates the changes to available channels since a prior communication.

For example, referring to FIG. 9A, suppose that the first time a vehicle 912 queries a database 110 on behalf of a wireless network 902, the query results 226 indicate that there are three available channels (channel A, channel B, and channel C) for the location 222 corresponding to the wireless network 902. When the vehicle 912 moves within the communication range 114 of the wireless network 902, the vehicle 912 may transmit available channel information 916a to the wireless network 902. The available channel information 916a may include an indication 972a that channel A is available, an indication 972b that channel B is available, and an indication 972c that channel C is available.

Referring now to FIG. 9B, further suppose that when the vehicle 912 subsequently queries the database 110 on behalf of the wireless network 902, the query results 226 indicate a different set of available channels (channel A, channel B, and channel D) for the location 222 corresponding to the wireless network 902. When the vehicle 912 moves within the communication range 114 of the wireless network 902, the available channel information 916b that is transmitted to the wireless network 902 may include an indication 972d that channel C is unavailable and an indication 972e that channel D is available. It is not necessary, however, for the available channel information 916b to include any information about channel A or channel B, because nothing about the availability of these channels has changed since the prior communication.

Figure 10:
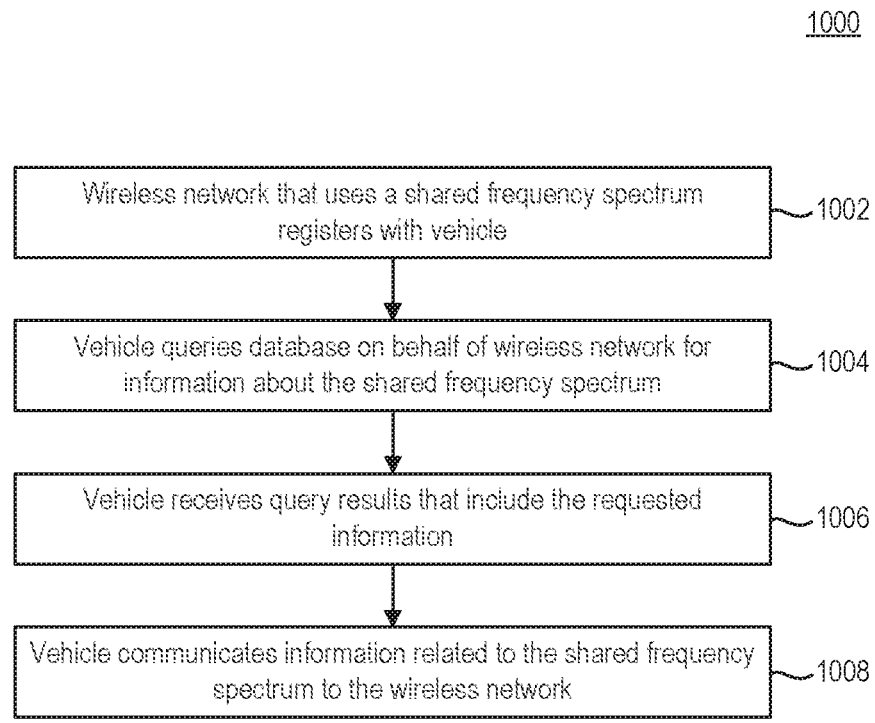
FIG. 10 illustrates an example of a method in which a vehicle obtains information related to a shared frequency spectrum on behalf of a wireless network that lacks Internet connectivity.

FIG. 10 illustrates an example of a method 1000 in which a vehicle 112 obtains information related to a shared frequency spectrum on behalf of a wireless network 102 that lacks Internet 108 connectivity. In accordance with the method 1000, when the vehicle 112 is within the communication range 114 of a wireless network 102, the wireless network 102 may register 1002 with the vehicle 112. For example, a node within the wireless network 102 (e.g., an access point 104) may transmit a registration message 218 to the vehicle 112. The registration message 218 may include an identifier 220 for the wireless network 102 and a location 222 of the wireless network 102.

Subsequently, when the vehicle 112 is connected to the Internet 108 (which may occur after the vehicle 112 has moved outside of the communication range 114 of the wireless network 102), the vehicle 112 may query 1004 a database 110 on behalf of the wireless network 102. For example, the vehicle 112 may send a query request 224 to the database 110 asking for information related to the shared frequency spectrum that will be used by the wireless network 102, such as what channels are available to be used. In response to the query request 224, the vehicle 112 may receive 1006 query results 226 that include the requested information related to the shared frequency spectrum, such as available channel information 216. At some point after receiving the query results 226, the vehicle 112 may move back into the communication range 114 of the wireless network 102 and communicate 1008 the information related to the shared frequency spectrum to the wireless network 102.

Figure 11:
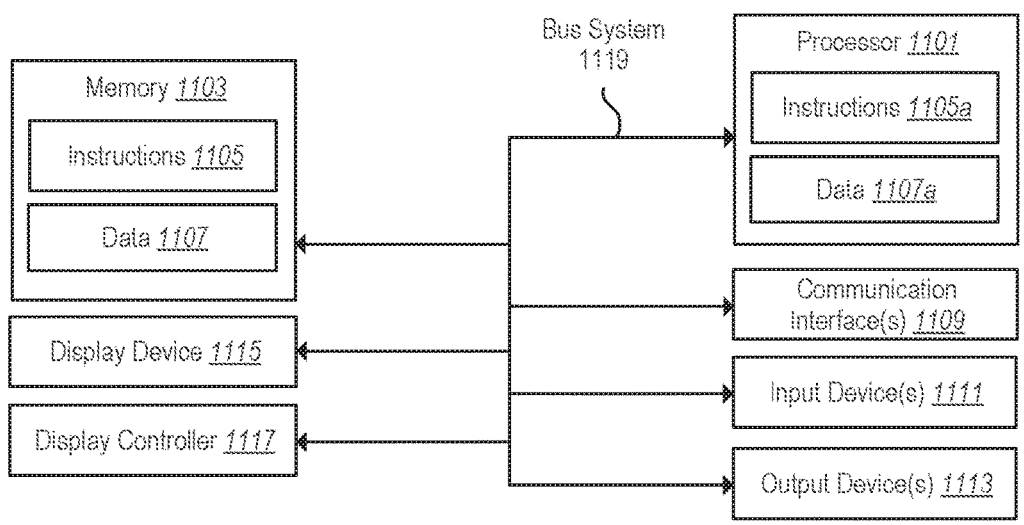
FIG. 11 illustrates certain components that may be included within a computer system.

FIG. 11 illustrates certain components that may be included within a computer system 1100. Some or all of the devices described herein (e.g., a vehicle 112, an access point 104, wireless clients 106a-c) may include a computer system 1100 with some or all of the components shown in FIG. 11.

The computer system 1100 includes a processor 1101. The processor 1101 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1101 may be referred to as a central processing unit (CPU). Although just a single processor 1101 is shown in the computer system 1100 of FIG. 11, in an alternative configuration, a combination of processors (e.g., an ARM and DSP) could be used.

The computer system 1100 also includes memory 1103. The memory 1103 may be any electronic component capable of storing electronic information. For example, the memory 1103 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 1105 and data 1107 may be stored in the memory 1103. The instructions 1105 may be executable by the processor 1101 to implement some or all of the methods disclosed herein. Executing the instructions 1105 may involve the use of the data 1107 that is stored in the memory 1103. When the processor 1101 executes the instructions 1105, various portions of the instructions 1105a may be loaded onto the processor 1101, and various pieces of data 1107a may be loaded onto the processor 1101.

Any of the various examples of modules and components described herein may be implemented, partially or wholly, as instructions 1105 stored in memory 1103 and executed by the processor 1101. Any of the various examples of data or messages described herein (e.g., the registration message 218, query request 224, query results 226) may be among the data 1107 that is stored in memory 1103 and used during execution of the instructions 1105 by the processor 1101.

A computer system 1100 may also include one or more communication interfaces 1109 for communicating with other electronic devices. The communication interfaces 1109 may be based on wired communication technology, wireless communication technology, or both. The communication interfaces 1109 may include one or more radios such as a TVWS radio 438, 440a-c, a satellite radio 442, and/or a WLAN radio 544. Some other examples of communication interfaces 1109 include a Universal Serial Bus (USB), an Ethernet adapter, a wireless adapter that operates in accordance with an IEEE 802.11 wireless communication protocol, a Bluetooth® wireless communication adapter, and an infrared (IR) communication port.

A computer system 1100 may also include one or more input devices 1111 and one or more output devices 1113. Some examples of input devices 1111 include a keyboard, mouse, microphone, remote control device, button, joystick, trackball, touchpad, and lightpen. Some examples of output devices 1113 include a speaker, printer, etc. One specific type of output device that is typically included in a computer system 100 is a display device 1115. Display devices 1115 used with embodiments disclosed herein may utilize any suitable image projection technology, such as liquid crystal display (LCD), light-emitting diode (LED), gas plasma, electroluminescence, or the like. A display controller 1117 may also be provided, for converting data 1107 stored in the memory 1103 into text, graphics, and/or moving images (as appropriate) shown on the display device 1115.

The various components of the computer system 1100 may be coupled together by one or more buses, which may include a power bus, a control signal bus, a status signal bus, a data bus, etc. For the sake of clarity, the various buses are illustrated in FIG. 11 as a bus system 1119.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system for providing information related to a shared frequency spectrum to a wireless network that lacks Internet connectivity, comprising:
   one or more processors; and
   memory comprising instructions that are executable by the one or more processors to perform operations comprising:
      receiving registration of the wireless network when a vehicle is within a communication range of the wireless network after having been outside the communication range of the wireless network;
      querying a database on behalf of the wireless network when an Internet connection is available;
      receiving query results comprising the information related to the shared frequency spectrum; and
      communicating the information related to the shared frequency spectrum to the wireless network when the vehicle or a proxy of the vehicle is again within the communication range of the wireless network after again having been outside the communication range of the wireless network.

2. The system of claim 1, wherein:
   the vehicle is selected from the group consisting of a satellite, an unmanned aerial vehicle (UAV), and a land vehicle; and
   the shared frequency spectrum comprises Television White Space (TVWS) frequencies.

3. The system of claim 1, wherein a same vehicle receives the registration of the wireless network, queries the database on behalf of the wireless network, receives the query results, and communicates the information related to the shared frequency spectrum to the wireless network.

4. The system of claim 1, wherein the information related to the shared frequency spectrum comprises available channel information and a time period during which the available channel information is valid.

5. The system of claim 1, wherein receiving the registration of the wireless network comprises receiving an identifier and a location of the wireless network.

6. The system of claim 1, wherein:
the vehicle comprises a satellite;
the registration of the wireless network is received during a portion of an orbit of the satellite when the satellite is within the communication range of the wireless network; and
the database is queried during another portion of the orbit of the satellite when the satellite is in wireless electronic communication with a satellite base station.

7. The system of claim 1, wherein:
the vehicle comprises a satellite;
the information related to the shared frequency spectrum comprises available channel information; and
the operations further comprise broadcasting the available channel information corresponding to any wireless networks that are within a footprint of the satellite.

8. The system of claim 1, wherein the operations additionally comprise communicating to the wireless network a time stamp indicating when the query results were obtained.

9. The system of claim 1, wherein:
the information related to the shared frequency spectrum comprises an indication of at least one available channel; and
the operations additionally comprise communicating to the wireless network a power level for the at least one available channel.

10. The system of claim 1, wherein communicating the information related to the shared frequency spectrum comprises communicating changes to available channels since a prior communication.

11. A system for enabling a wireless network that lacks Internet connectivity to obtain information related to a shared frequency spectrum, comprising:
one or more processors; and
memory comprising instructions that are executable by the one or more processors to perform operations comprising:
registering the wireless network with a vehicle when the vehicle is within a communication range of the wireless network after having been outside the communication range of the wireless network; and
subsequently receiving the information related to the shared frequency spectrum when the vehicle or a proxy of the vehicle is again within the communication range of the wireless network after again having been outside the communication range of the wireless network.

12. The system of claim 11, wherein the vehicle is selected from the group consisting of a satellite, an unmanned aerial vehicle (UAV), and a land vehicle.

13. The system of claim 11, wherein the information related to the shared frequency spectrum comprises available channel information and a time period during which the available channel information is valid.

14. The system of claim 11, wherein:
the system is configured for implementation in an access point;
the information related to the shared frequency spectrum comprises available channel information; and
the operations further comprise forcing a plurality of wireless clients that are served by the access point to communicate using at least one available channel that is specified in the available channel information.

15. The system of claim 11, wherein:
the system is configured for implementation in a proxy node that serves a plurality of access points; and
the operations further comprise disseminating the information related to the shared frequency spectrum to the plurality of access points.

16. The system of claim 11, wherein registering the wireless network with the vehicle comprises transmitting an identifier and a location of the wireless network to the vehicle.

17. The system of claim 11, wherein the vehicle comprises a satellite, and wherein registering the wireless network comprises:
receiving a beacon signal from the satellite;
negotiating a communication channel with the satellite; and
transmitting an identifier and a location of the wireless network to the satellite via the communication channel.

18. The system of claim 11, wherein:
the vehicle comprises a satellite; and
the operations further comprise listening for communication from the satellite only during time periods when the satellite is scheduled to be within the communication range of the wireless network.

19. The system of claim 11, wherein the operations additionally comprise receiving a time stamp indicating when the information related to the shared frequency spectrum was obtained.

20. A method for providing information related to a shared frequency spectrum to a wireless network that lacks Internet connectivity, comprising:
receiving registration of the wireless network when a vehicle is within a communication range of the wireless network after having been outside the communication range of the wireless network;
querying a database on behalf of the wireless network when an Internet connection is available;
receiving query results comprising the information related to the shared frequency spectrum; and
communicating the information related to the shared frequency spectrum to the wireless network when the vehicle or a proxy of the vehicle is again within the communication range of the wireless network after again having been outside the communication range of the wireless network.

* * * * *